US012786581B2

(12) United States Patent
Takahashi et al.

(10) Patent No.: US 12,786,581 B2
(45) Date of Patent: Nov. 3, 2026

(54) PROCESSING APPARATUS, IMAGE PICKUP APPARATUS, LENS APPARATUS, IMAGING SYSTEM, IMAGE PROCESSING APPARATUS, SYSTEM, PROCESSING METHOD, AND STORAGE MEDIUM

(71) Applicant: CANON KABUSHIKI KAISHA, Tokyo (JP)

(72) Inventors: Makoto Takahashi, Tochigi (JP); Kazuya Shimomura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 19/068,520

(22) Filed: Mar. 3, 2025

(65) Prior Publication Data

US 2025/0310641 A1 Oct. 2, 2025

(30) Foreign Application Priority Data

Mar. 29, 2024 (JP) ................................ 2024-055436

(51) Int. Cl.

*H04N 25/61* (2023.01)
*G06T 5/80* (2024.01)
*H04N 1/40* (2006.01)
*H04N 7/01* (2006.01)
*H04N 23/80* (2023.01)
*H04N 23/81* (2023.01)

(52) U.S. Cl.

CPC ............... *H04N 25/61* (2023.01); *G06T 5/80* (2024.01); *H04N 1/40068* (2013.01); *H04N 7/0117* (2013.01); *H04N 23/81* (2023.01); *H04N 23/815* (2023.01)

(58) Field of Classification Search

None

See application file for complete search history.

(56) References Cited

U.S. PATENT DOCUMENTS

| | | | | |
|---|---|---|---|---|
| 2004/0017492 A1* | 1/2004 | Stavely | ................ | H04N 5/2628 348/240.2 |
| 2009/0167925 A1* | 7/2009 | Murata | ................ | H04N 23/663 382/275 |
| 2011/0037881 A1* | 2/2011 | Natsume | .............. | H04N 23/663 348/241 |

(Continued)

FOREIGN PATENT DOCUMENTS

| | | |
|---|---|---|
| JP | 2008295097 A | 12/2008 |
| JP | 2009043060 A | 2/2009 |

(Continued)

OTHER PUBLICATIONS

Extended European Search Report issued in European Appln. No. 25161796.5 mailed Jun. 17, 2025.

(Continued)

*Primary Examiner* — Twyler L Haskins
*Assistant Examiner* — Wesley J Chiu
(74) *Attorney, Agent, or Firm* — ROSSI, KIMMS & McDOWELL LLP

(57) ABSTRACT

A processing apparatus includes a processor configured to acquire an imaging resolution and an output resolution, and acquire information on a focal length of an optical system and center position information on an image according to the imaging resolution and the output resolution.

17 Claims, 5 Drawing Sheets

(56) References Cited

U.S. PATENT DOCUMENTS

| | | | | |
|---|---|---|---|---|
| 2011/0043667 | A1* | 2/2011 | Kotani | G06T 5/73 348/241 |
| 2011/0109774 | A1* | 5/2011 | Onomura | G06T 3/12 348/241 |
| 2012/0038753 | A1* | 2/2012 | Hoshino | H04N 25/61 348/51 |
| 2012/0044369 | A1* | 2/2012 | Irisawa | H04N 23/60 359/554 |
| 2014/0036050 | A1* | 2/2014 | Yoshino | A61B 1/00009 348/65 |
| 2019/0356825 | A1 | 11/2019 | Motoshima et al. | |
| 2023/0388637 | A1 | 11/2023 | Ishikawa | |
| 2023/0412932 | A1* | 12/2023 | Ollila | G06T 3/18 |

FOREIGN PATENT DOCUMENTS

| | | | |
|---|---|---|---|
| JP | 2018106496 | A | 7/2018 |
| JP | 2020064208 | A | 4/2020 |
| JP | 2023176702 | A | 12/2023 |

OTHER PUBLICATIONS

Communication pursuant to Article 94(3) EPC issued in European Appln. No. 25161796.5 mailed Jul. 20, 2026.

* cited by examiner

PROCESSING APPARATUS, IMAGE PICKUP APPARATUS, LENS APPARATUS, IMAGING SYSTEM, IMAGE PROCESSING APPARATUS, SYSTEM, PROCESSING METHOD, AND STORAGE MEDIUM

BACKGROUND

Technical Field

The present disclosure relates to a processing apparatus, an image pickup apparatus, a lens apparatus, an imaging system, an image processing apparatus, a system, a processing method, and a storage medium.

Description of Related Art

Visual effects (VFX), which is a combination technique of computer graphics (CG) space (virtual video) and real space (real-life video) have conventionally been known. Highly accurate distortion correction has recently been demanded to improve the quality of a combined image, and various proposals have been made to meet such demands (see Japanese Patent Application Laid-Open Nos. 2008-295097 and 2023-176702).

SUMMARY

A processing apparatus according to one aspect of the disclosure includes a processor configured to acquire an imaging resolution and an output resolution, and acquire information on a focal length of an optical system and center position information on an image according to the imaging resolution and the output resolution. An image pickup apparatus, a lens apparatus, an imaging system, and a system each having the above processing apparatus also constitute another aspect of the disclosure. An image processing method using the above processing apparatus and a processing method corresponding to the above processing apparatus also constitute another aspect of the disclosure. A storage medium storing a program that causes a computer to execute the above processing method also constitutes another aspect of the disclosure.

Further features of various embodiments of the disclosure will become apparent from the following description of embodiments with reference to the attached drawings.

DETAILED DESCRIPTION

Figure 1:
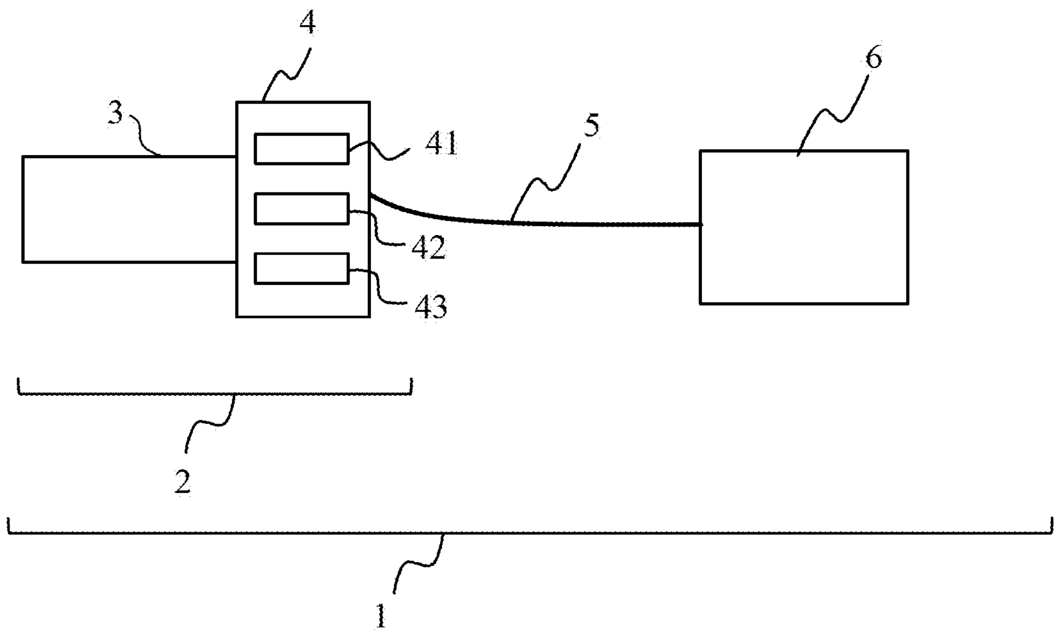
FIG. 1 is a configuration diagram of a VFX system according to this embodiment of the present disclosure.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description of embodiments according to the disclosure will be given. Corresponding elements in respective figures will be designated by the same reference numerals, and a duplicate description thereof will be omitted.

FIG. 1 is a configuration diagram of a VFX system 1 according to this embodiment of the present disclosure. The VFX system 1 includes an imaging system 2 and an image processing system 6. The imaging system 2 includes a lens (lens apparatus) 3 and an image pickup apparatus 4. In this embodiment, the lens 3 is attachable to and detachable from the image pickup apparatus 4, but may be integrated with the image pickup apparatus 4.

The lens 3 includes an unillustrated optical system. The optical system includes at least one imaging lens and forms an object image on an imaging surface of an image sensor. The optical system may include various optical elements such as a prism, or may include a zoom lens, a focus lens, etc.

The image pickup apparatus 4 includes an unillustrated image sensor that photoelectrically converts the optical image formed by the optical system. The image sensor includes, for example, a Charge Coupled Device (CCD) image sensor or a Complementary MOS (CMOS) image sensor, and outputs the object image formed on the imaging surface.

The image pickup apparatus 4 includes a first acquiring unit 41, a second acquiring unit 42, and a transmitter 43. The first acquiring unit 41 acquires the imaging resolution and the output resolution. The imaging resolution is the resolution of the image acquired by the image sensor (can be set arbitrarily as long as it is equal to or lower than the maximum resolution of the image sensor), and the output resolution is the resolution of the image output by the imaging system 2. In this embodiment, the first acquiring unit acquires focal length information and distortion information. The focal length information and distortion information are acquired from the lens 3 in a case where the lens 3 is attachable to and detachable from the image pickup apparatus 4, and may be acquired from an unillustrated memory provided in the imaging system 2 in a case where the lens 3 is integrated with the image pickup apparatus 4. The second acquiring unit 42 acquires information on the focal length of the optical system (focal length for pixel pitch) and center position information on the image (image center coordinates) according to the imaging resolution and the output resolution. The transmitter 43 transmits (outputs) the information on the focal length and the image center coordinates acquired by the second acquiring unit 42 to an external device (the image processing system 6 in the present embodiment). In this embodiment, the transmitter 43 transmits the distortion information to the external device. In this embodiment, the information from the transmitter 43 is transmitted to the image processing system 6 via a cable 5 (by wired communication), but may be transmitted by wireless communication.

In this embodiment, the first acquiring unit 41 and the second acquiring unit 42 are provided in the image pickup apparatus 4, but the present disclosure is not limited to this example. They may be provided in the lens 3 or the image processing system 6, or in another processing apparatus. In a case where they are provided in the lens 3 or the processing apparatus, the transmitter 43 may also be provided.

The image processing system 6 includes a PC and processing software. The PC includes an acquiring unit configured to acquire images captured by the imaging system 2 and imaging information, and a processing unit configured to perform processing such as VFX combination etc. using the information acquired by the acquiring unit. The processing software that performs the VFX combination generally performs processing in accordance with the OpenCV method for distortion correction.

Information for distortion correction in accordance with the OpenCV method (distortion correcting information) includes distortion parameters (distortion information), image center coordinates, and focal length (information on the focal length) per pitch (pixel distance).

More specifically, the distortion parameters are distortion correcting coefficients k1, k2, and k3. A coordinate xc in the horizontal direction after distortion is corrected is expressed as follows:

$$xc = x(1 + k1 \times r^2 + k2 \times r^4 + k3 \times r^6) \quad (1a)$$

where x is a coordinate in the horizontal direction of an image to be corrected, and r is an image height of the image to be corrected.

Similarly, a vertical coordinate yc in the vertical direction after distortion is corrected is expressed as follows:

$$yc = y(1 + k1 \times r^2 + k2 \times r^4 + k3 \times r^6) \quad (1b)$$

where y is a coordinate in the vertical direction of the image to be corrected.

A focal length per pitch in the horizontal direction fx is expressed as follows:

$$fx = f/px \quad (2a)$$

where f is a focal length of the optical system, and px is a pixel size in the horizontal direction.

Similarly, a focal length per pitch in the vertical direction fy is expressed as follows:

$$fy = f/py \quad (2b)$$

where py is a pixel size in the vertical direction.

Assume that Cx is an image center coordinate in the horizontal direction, and Cy is an image center coordinate in the vertical direction.

In this embodiment, these parameters are properly calculated within the imaging system 2 and then transmitted. Thereby, good distortion correcting information can be prepared and a recorded data amount can be suppressed.

Figure 2:
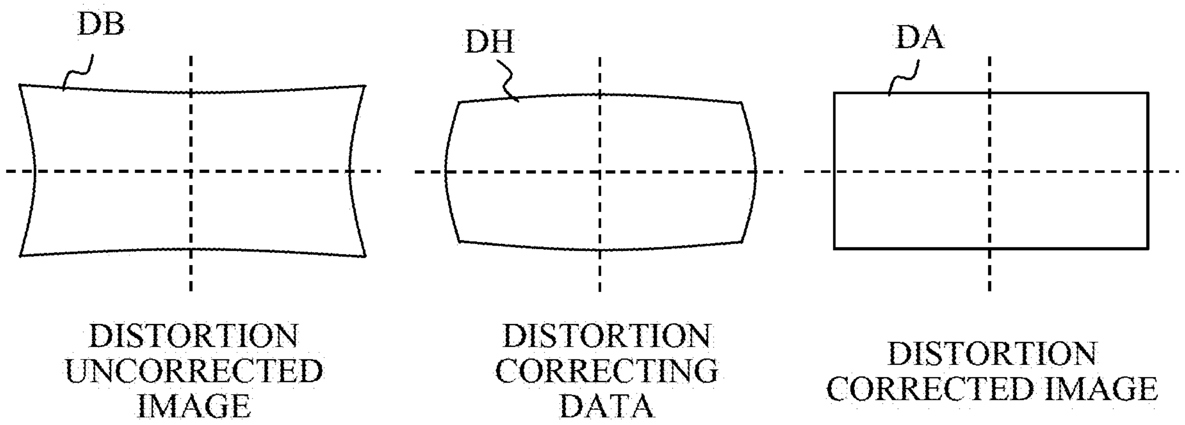
FIG. 2 is a conceptual diagram of distortion correction.

FIG. 2 is a conceptual diagram of distortion correction. In the distortion correction, distortion uncorrected image DB, which is a distorted image, is multiplied by centrally symmetrical, distortion correcting data DH, which is an inverse magnification of the distortion uncorrected image DB according to a distance from the center. Thereby, it is corrected to an image with less distortion like distortion corrected image DA. Here, the size and position are defined with the distortion uncorrected image DB as the reference resolution and the image center coordinates in the upper left corner of the image as the reference image center coordinates, and the resolution and image center coordinates of the distortion correcting data DH are also configured to match them.

Figure 3:
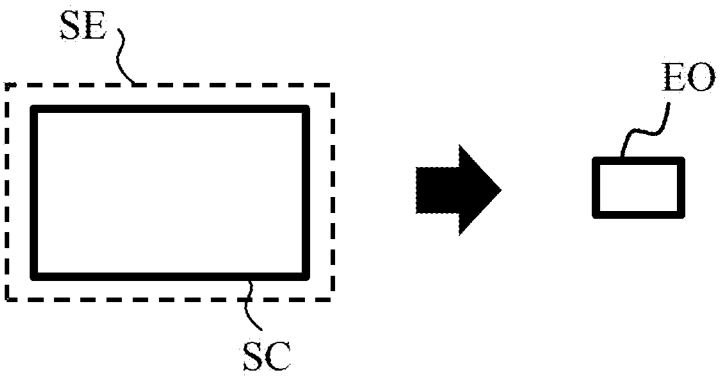
FIG. 3 is a conceptual diagram of an imaging resolution and an output resolution.

FIG. 3 is a conceptual diagram of the imaging resolution and output resolution. The photographer (user) performs imaging by arbitrarily selecting imaging resolution SC for imageable resolution SE of the image sensor, and arbitrarily selects the output resolution EO after imaging. The imaging resolution SC and output resolution EO are transmitted to the image processing system 6. In a case where the transmitted output resolution EO is different from the resolution of the distortion correcting data, problems will occur in the distortion correction in the image processing system 6.

A description will now be given of two examples in which problems occur in the image processing system 6.

Figure 4:
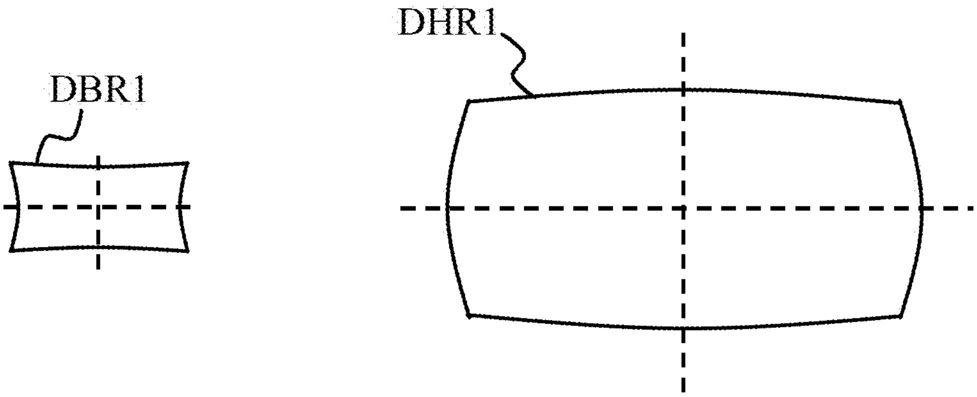
FIG. 4 is a conceptual diagram in a case where a relationship between focal lengths per pitch and distortion correcting data is improper.

The first example will now be described with reference to FIG. 4. FIG. 4 is a conceptual diagram in a case where a relationship between the focal lengths fx and fy per pitch and the distortion correcting data is improper. The distortion uncorrecting image DBR1 before distortion correction is transmitted at a resolution arbitrarily reduced by the photographer, but since the distortion correcting data DHR1 remains at the reference resolution (before reduction), distortion cannot be corrected correctly in a case where they are multiplied.

Figure 5:
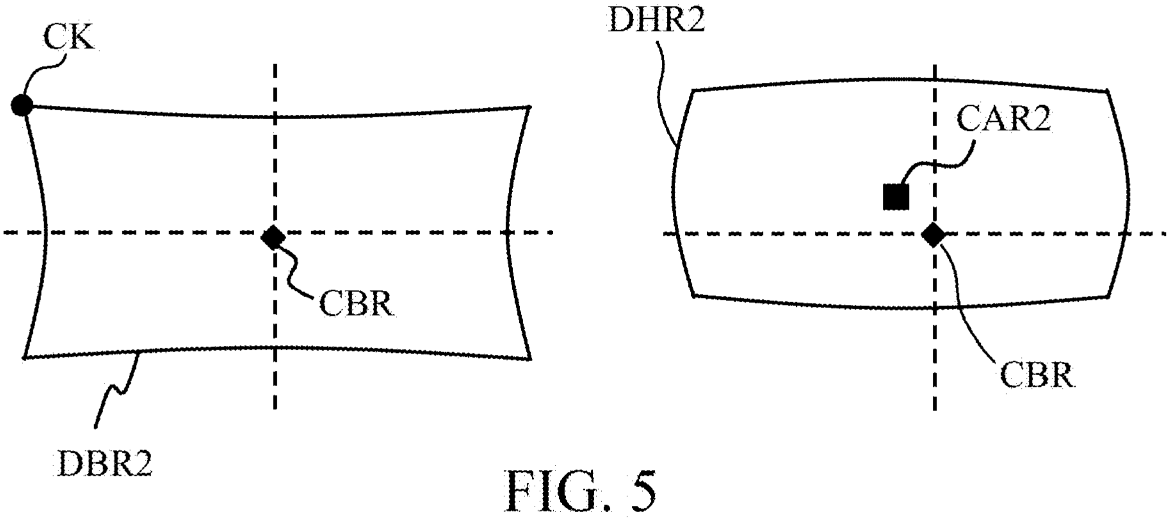
FIG. 5 is a conceptual diagram in a case where a relationship between image center coordinates and distortion correcting data is improper.

The second example will now be described with reference to FIG. 5. FIG. 5 is a conceptual diagram in a case where a relationship between the image center coordinates Cx and Cy and the distortion correcting data is improper. The image center coordinate CBR is defined based on the coordinate CK at the upper left of the distortion uncorrected image DBR2. In a case where the image center coordinate CAR2 of the distortion correcting data DHR2 shifts from the center coordinate CBR, distortion cannot be corrected correctly in a case where they are multiplied.

Thus, in a case where the pixel size changes relatively due to reduction, enlargement, etc., or in a case where the image center coordinates change, the above problems occur if the conventional distortion correction is performed as is.

Accordingly, this embodiment performs processing according to the imaging resolution and output resolution for the focal lengths fx and fy per pitch and the image center coordinates Cx and Cy. Thereby, correct distortion correcting processing can be performed.

The distortion correcting coefficients k1, k2, and k3 and the focal lengths fx and fy per pitch have different values for each zoom position and focus position. Thus, storing them in table format would result in an enormous data amount.

Accordingly, this embodiment performs calculation processing according to the imaging resolution and output resolution within the imaging system 2 and then transmits distortion correcting information. Thereby, a recorded data amount can be suppressed.

Figure 6:
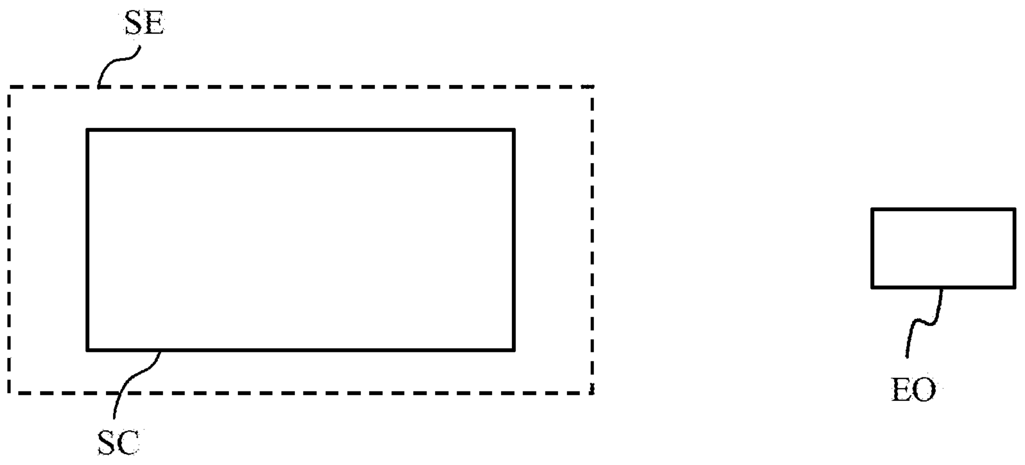
FIG. 6 is a conceptual diagram of calculation processing.

FIG. 6 is a conceptual diagram of the calculation processing according to this embodiment. In FIG. 6, the imageable resolution SE of the image sensor is 4320 pixels, the imaging resolution SC is 3240 pixels, and the output resolution EO is 1080 pixels. Since the resolution is converted to a lower resolution, the pixel size of the output image becomes larger (coarser) relative to the unit size (or unit angle of view). In FIG. 6, the output pixels are reduced by one third from 3240 pixels to 1080 pixels, so the pixel size becomes three times larger (coarser). The pixel size after the relative size has changed in this way is defined as a "converted output pixel size." Using the converted output pixel size for the calculation can properly set the relationship between the output image and the distortion correcting data.

In this embodiment, the second acquiring unit 42 acquires the focal length fx per pitch in the horizontal direction and the focal length fy per pitch in the vertical direction using the following equations (3a) and (3b):

$$fx = f/(\text{converted output pixel size}) \tag{3a}$$

$$fy = f/(\text{converted output pixel size}) \tag{3b}$$

In FIG. 6, in a case where the reference pixel size is px, the converted output pixel size pKx is 3 px.

The second acquiring unit 42 acquires the image center coordinate Cx in the horizontal direction and the image center coordinate Cy in the vertical direction using the following equations (4a) and (4b):

$$Cx = \text{output resolution}/2 \tag{4a}$$

$$Cy = \text{output resolution}/2 \tag{4b}$$

Due to such processing, distortion can be satisfactorily corrected.

The unit of resolution is not limited to pixels, and may be expressed in size or length (mm), etc.

Specific processing methods will be described below for each example.

Example 1

Figure 7:
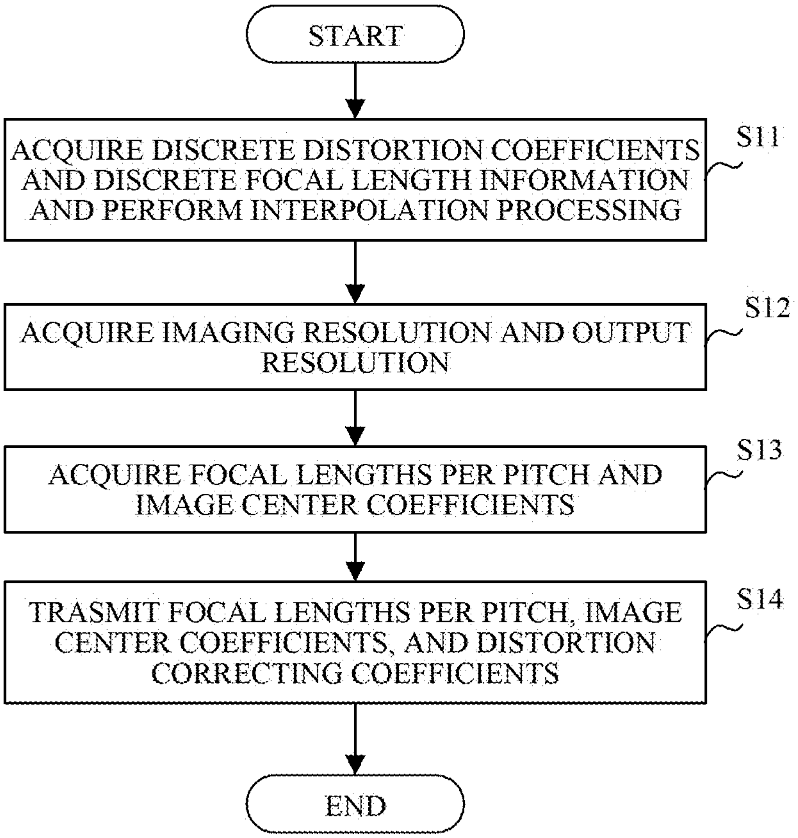
FIG. 7 is a flowchart illustrating processing on distortion correcting information in Example 1.

FIG. 7 is a flowchart illustrating processing on distortion correcting information according to this example. This flow is started, for example, when the photographer presses the "output button." In step S11, the first acquiring unit 41 acquires discrete distortion coefficients and discrete focal length information and performs interpolation processing. In step S12, the first acquiring unit 41 acquires the imaging resolution and output resolution set by the photographer in the imaging system 2. In step S13, the second acquiring unit 42 acquires the focal lengths per pitch and the image center coordinates according to the imaging resolution and the output resolution acquired in step S12. In step S14, the transmitter 43 transmits the focal lengths per pitch, the image center coordinates, and the distortion coefficients acquired in step S11. The distortion coefficients are not processed by the second acquiring unit 42. The order of steps S11 and S12 may be reversed.

Figure 8:
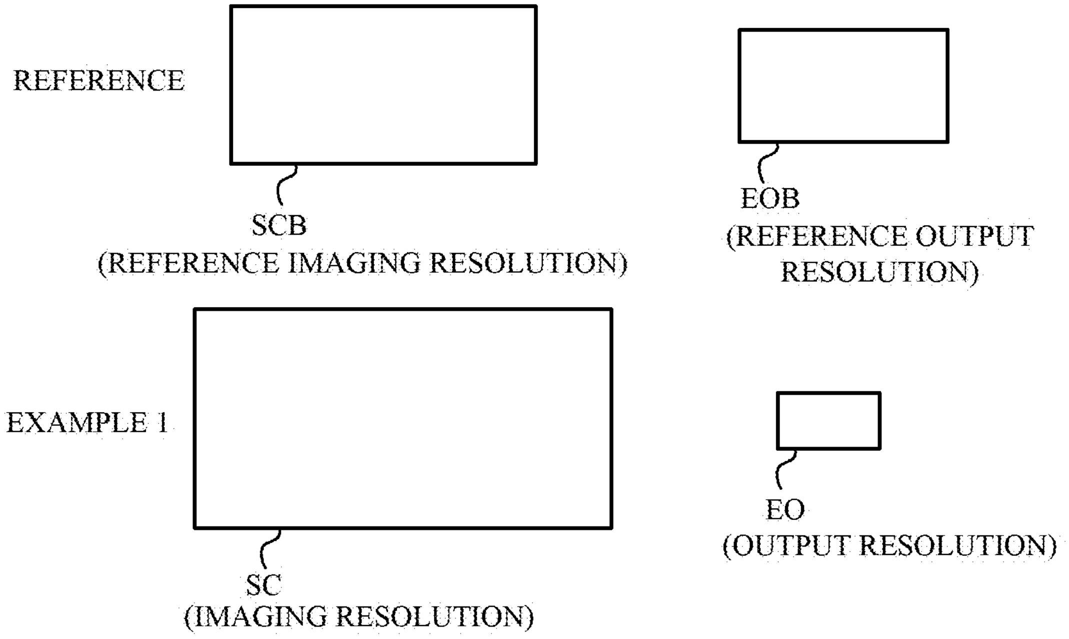
FIG. 8 is a schematic diagram of a resolution in Example 1.

FIG. 8 is a schematic diagram of the resolution in this example. For description convenience, only the horizontal direction will be described as an example. In this example, the first acquiring unit 41 acquires the reference imaging resolution, the reference output resolution, and the reference focal length per pitch, and the second acquiring unit 42 calculates how the output image has changed relative to the reference.

In this example, the reference imaging resolution SCB is 3140 pixels, the reference output resolution EOB is 2160 pixels, and the reference focal length per pitch fxb is 2924 pixels. The imaging resolution SC is 4320 pixels, and the output resolution EO is 1080 pixels. At this time, a reference change rate (=reference output resolution/reference imaging resolution) indicating how much the output resolution changes relative to the imaging resolution at the reference resolution is 0.688 (=2160/3140). An arbitrary change rate (=output resolution/imaging resolution) indicating how much the output resolution changes relative to the imaging resolution at an arbitrary resolution is 0.250 (=1080/4320). A converted output pixel size (=reference change rate/arbitrary change rate) pKx (=(EOB/SCB)/(EO/SC)), which is a pixel size after the relative size changes, is 2.752 (=0.688/0.25).

The second acquiring unit 42 acquires the focal length per pitch fx (=fxb/pKx) as 1063 (=2924/2.752).

The above relationship is expressed as follows:

$$(fxb/fx) \times (EO/EOB) \times (SCB/SC) = 1 \tag{5}$$

In this example, the following inequality (6) may be satisfied:

$$0.95 < (fxb/fx) \times (EO/EOB) \times (SCB/SC) < 1.05 \tag{6}$$

Satisfying inequality (6) can provide easy and good distortion correction.

Inequality (6) may be replaced with inequality (6a) below:

$$0.97 < (fxb/fx) \times (EO/EOB) \times (SCB/SC) < 1.03 \tag{6a}$$

Inequality (6) may be replaced with inequality (6b) below:

$$0.99 < (fxb/fx) \times (EO/EOB) \times (SCB/SC) < 1.01 \tag{6b}$$

As another configuration, a partial relationship among the output resolution EO, the reference output resolution EOB, the imaging resolution SC, and the reference imaging resolution SCB is arbitrary formed in the table format and used in combination with the above calculations. For example, according to the resolution selected by the user, a value SCB/SC, which is a calculation result of the imaging resolution SC and the reference imaging resolution SCB, may be selected from the table, and the equation (fxb/fx)×(EO/EOB) may be used for remaining processing.

The second acquiring unit 42 acquires the image center coordinate Cx (=EO/2) as 540 (=1080/2).

In this example, the following inequality (7) may be satisfied:

$$0.475 < Cx/EO < 0.525 \tag{7}$$

Satisfying inequality (7) can provide easy and satisfactory distortion correction.

Inequality (7) may be replaced with inequality (7a):

$$0.485 < Cx/EO < 0.515 \tag{7a}$$

Inequality (7) may be replaced with inequality (7b):

$$0.495 < Cx/EO < 0.505 \tag{7b}$$

This example properly calculates the focal lengths per pitch and the image center coordinates, and transmits the calculated focal lengths per pitch and image center coordinates to an external device. Thereby, a recorded data amount can be suppressed and good distortion correction can be achieved.

In this example, the imaging system 2 has a table of the distortion coefficients and focal length information for each of the zoom and focus positions.

The number of distortion correcting coefficients can be set to six or more on OpenCV, but this example performs highly accurate calculations based on the proportional relationship at the pixel level, thus sets the number of coefficients for distortion correction to three, and can suppress the data amount.

Example 2

This example will discuss processing on distortion correcting information in a case where the imaging resolution is not changed. This example will discuss only the configuration that is different from that of Example 1, and a description of the common configurations will be omitted.

Figure 9:
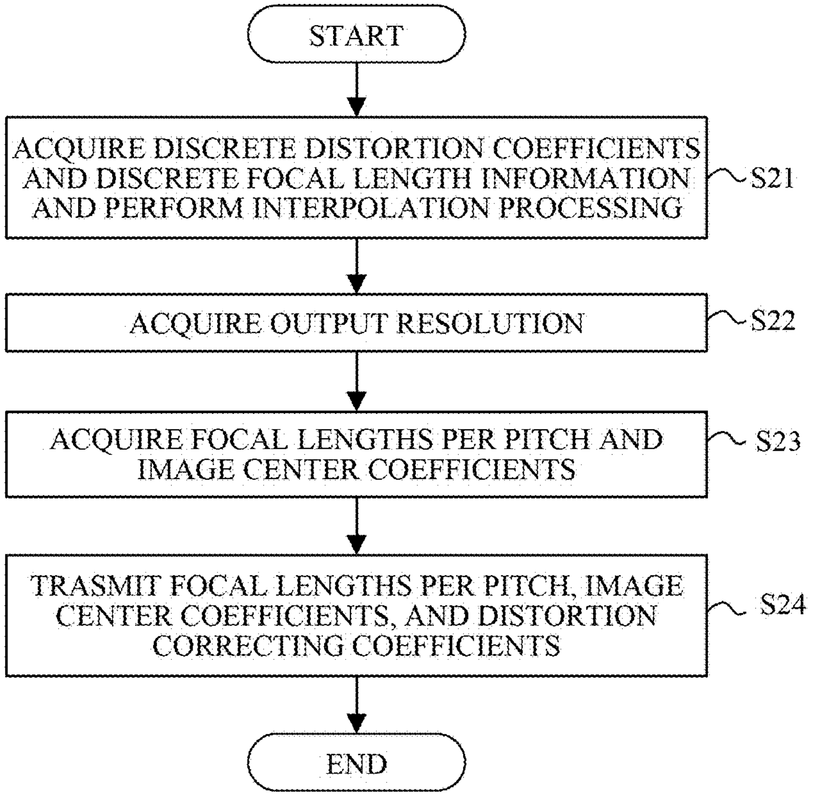
FIG. 9 is a flowchart illustrating processing on distortion correcting information in Example 2.

FIG. 9 is a flowchart illustrating processing on distortion correcting information according to this example. This flow is started, for example, when the photographer presses the "output button." In step S21, the first acquiring unit 41 acquires discrete distortion coefficients and discrete focal length information and performs interpolation processing. In step S22, the first acquiring unit 41 acquires the output resolution set by the photographer in the imaging system 2. In step S23, the second acquiring unit 42 acquires the focal lengths per pitch and the image center coordinates according to the output resolution acquired in step S22. In step S24, the transmitter 43 transmits the focal lengths per pitch, the image center coordinates, and the distortion correcting coefficients acquired in step S21. The distortion coefficients are not processed by the second acquiring unit 42. The order of steps S21 and S22 may be reversed.

In this example, the reference output resolution EOB is 2160 pixels, the reference focal length per pitch fxb is 2924 pixels, and the output resolution EO is 1080 pixels. At this time, the converted output pixel size pKx (=EOB/EO) is 2 (=2160/1080).

The second acquiring unit 42 acquires the focal length per pitch fx (=fxb/pKx) as 1462 (=2924/2). The second acquiring unit 42 acquires the image center coordinate Cx (=EO/2) as 540 (=1080/2).

Example 3

This example will discuss processing on distortion correcting information in a case where the output resolution is not changed. This example does not acquire discrete distortion coefficients or discrete focal length information or does not perform interpolation processing, and the imaging system 2 acquires distortion coefficients and focal length information in an interpolated state. This example will discuss only the configuration different from that of Example 1, and omit a description of the common configuration.

Figure 10:
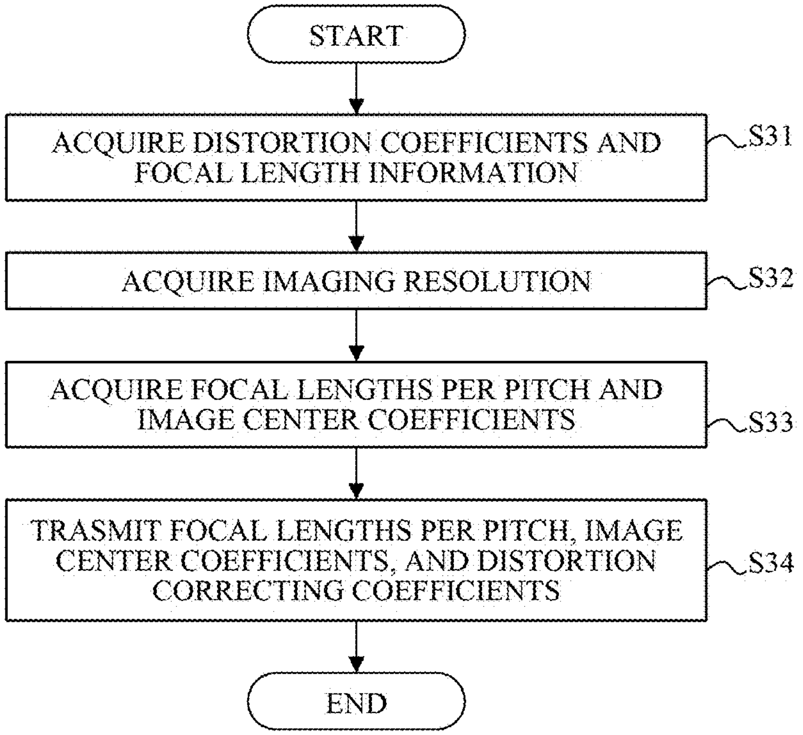
FIG. 10 is a flowchart illustrating processing on distortion correcting information in Example 3.

FIG. 10 is a flowchart illustrating processing on distortion correcting information according to this example. This flow is started, for example, when the photographer presses the "output button." In step S31, the first acquiring unit 41 acquires the distortion coefficients and focal length information of the optical system. In step S32, the first acquiring unit 41 acquires the imaging resolution set by the photographer in the imaging system 2. In step S33, the second acquiring unit 42 acquires the focal lengths per pitch and the image center coordinates according to the imaging resolution acquired in step S32. In step S34, the transmitter 43 transmits the focal lengths per pitch, the image center coordinates, and the distortion coefficients acquired in step S31. The distortion coefficients are not processed by the second acquiring unit 42. The order of steps S31 and S32 may be reversed.

In this example, the reference imaging resolution SCB is 3140 pixels, and the reference focal length per pitch fxb is 2924 pixels. The imaging resolution SC is 4320 pixels, and the output resolution EO is 2160 pixels. In this case, the converted output pixel size pKx (=SC/SCB) is 1.3758 (=4320/3140).

The second acquiring unit 42 acquires the focal length per pitch fx (=fxb/pKx) as 2125 (=2924/1.3758). The second acquiring unit 42 acquires the image center coordinate Cx (=EO/2) as 1080 (=2160/2).

Example 4

This example will discuss processing in a case where the focal lengths per pitch and the image center coordinate have errors. This example will discuss only the configuration different from that of Example 1, and omit a description of the common configurations.

In this example, the reference imaging resolution SCB is 3140 pixels, the reference output resolution EOB is 2160 pixels, and the reference focal length per pitch fxb is 2924 pixels. The imaging resolution SC is 4320 pixels, and the output resolution EO is 1080 pixels.

At this time, the second acquiring unit 42 acquires the focal length per pitch fx as 1015, and the image center coordinate Cx as 565.

(fxb/fx)×(EO/EOB)×(SCB/SC) is 1.047, which satisfies inequality (6), and Cx/EO is 0.523, which satisfies inequality (7). Thus, good distortion correction can be easily achieved.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that the disclosure is not limited to the example embodiments. The scope of the following claims is to be accorded the broadest interpretation so as to encompass all such modifications and equivalent structures and functions.

Each example can provide a processing apparatus that can prepare good distortion correcting information and suppress a recorded data amount.

This application claims priority to Japanese Patent Application No. 2024-055436, which was filed on Mar. 29, 2024, and which is hereby incorporated by reference herein in its entirety.

What is claimed is:

1. A processing apparatus comprising:

a processor configured to:

acquire an imaging resolution and an output resolution, and acquire information on a focal length of an optical system and center position information on an image according to the imaging resolution and the output resolution, wherein the processor is configured to acquire a reference imaging resolution, a reference output resolution, and information on a reference focal length, and wherein the following inequality is satisfied:

$$0.95 < (fxb/fx) \times (EO/EOB) \times (SCB/SC) < 1.05$$

where fx is the information on the focal length, fxb is the information on the reference focal length, SC is the imaging resolution, SCB is the reference imaging resolution, EO is the output resolution, and EOB is the reference output resolution.

2. The processing apparatus according to claim 1, further comprising a transmitter configured to transmit the information on the focal length and the center position information to an external device.

3. The processing apparatus according to claim 1, further comprising a memory storing values of SCB/SC in a table format.

4. The processing apparatus according to claim 1, wherein the following inequality is satisfied:

$$0.475 < Cx/EO < 0.525$$

where EO is the output resolution, and Cx is the central position information.

5. The processing apparatus according to claim 1, wherein the processor is configured to:

acquire position information on zoom and focus, and perform interpolation processing for the information on the focal length according to the position information.

6. The processing apparatus according to claim 1, wherein the processor is configured to acquire focal length information and distortion information.

7. The processing apparatus according to claim 6, wherein the processor is configured not to process the distortion information according to the imaging resolution and the output resolution.

8. The processing apparatus according to claim 6, wherein the distortion information has three or less distortion correcting coefficients.

9. An image pickup apparatus comprising:

the processing apparatus according to claim 1; and an image sensor configured to photoelectrically convert an optical image formed by an optical system.

10. The image pickup apparatus according to claim 9, wherein the processor is configured to acquire focal length information and distortion information.

11. The image pickup apparatus according to claim 10, wherein the processor is configured to acquire the focal length information and the distortion information from a lens apparatus having the optical system.

12. A lens apparatus comprising:

the processing apparatus according to claim 1; and an optical system.

13. An imaging system comprising:

the processing apparatus according to claim 1;

the optical system; and an image sensor configured to photoelectrically convert an optical image formed by the optical system.

14. An image processing apparatus comprising:

a processor configured to:

acquire, from the processing apparatus according to claim 1, the information on the focal length and the central position information; and perform processing using the information on the focal length and the central position information.

15. A system comprising:

the imaging system according to claim 13; or the image processing apparatus according to claim 14.

16. A processing method comprising:

acquiring an imaging resolution and an output resolution; and acquiring information on a focal length of an optical system and center position information on an image according to the imaging resolution and the output resolution; and acquiring a reference imaging resolution, a reference output resolution, and information on a reference focal length, wherein the following inequality is satisfied:

$$0.95 < (fxb/fx) \times (EO/EOB) \times (SCB/SC) < 1.05$$

where fx is the information on the focal length, fxb is the information on the reference focal length, SC is the imaging resolution, SCB is the reference imaging resolution, EO is the output resolution, and EOB is the reference output resolution.

17. A non-transitory computer-readable storage medium storing a program that causes a computer to execute the processing method according to claim 16.

* * * * *